July 7, 1931.  F. SUCHER ET AL  1,813,210
MERRY-GO-ROUND
Filed May 19, 1930  4 Sheets-Sheet 1
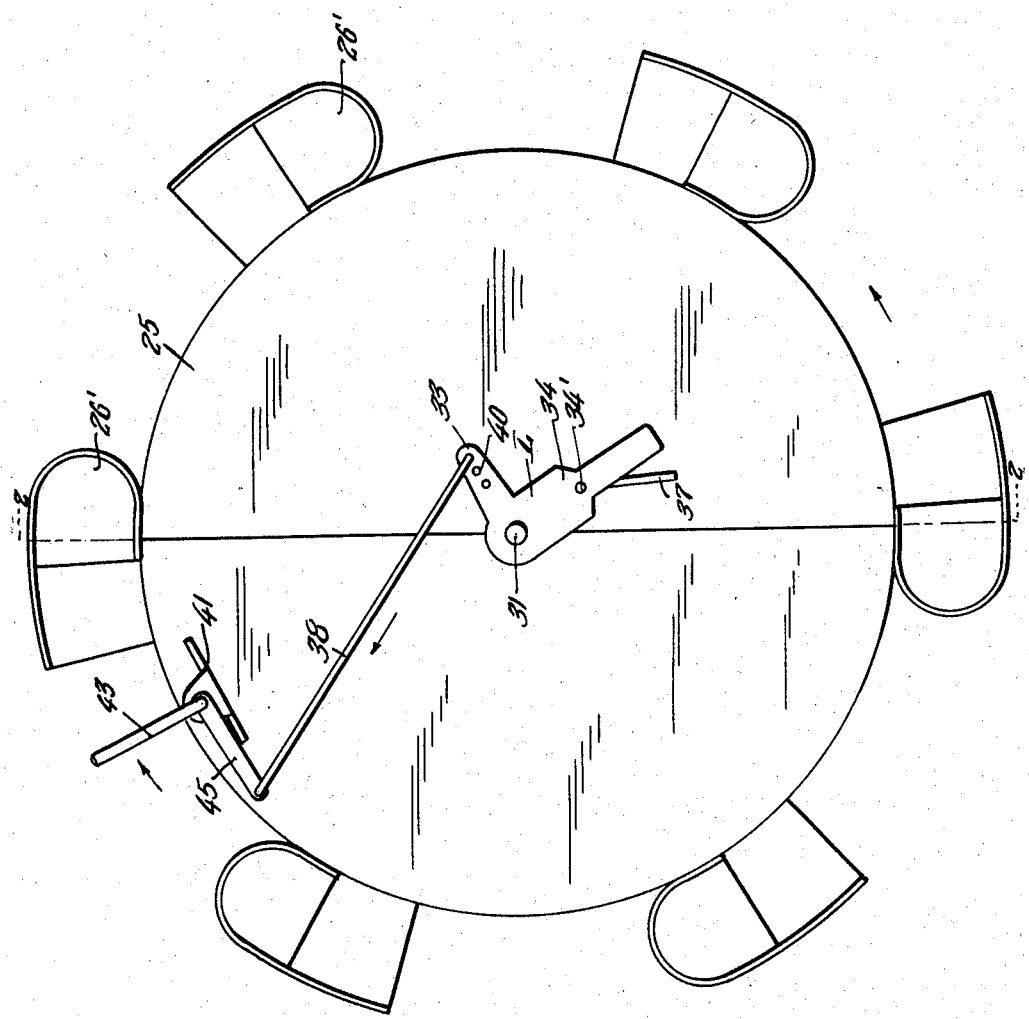
Inventors
Felix Sucher
S. H. Sucher
By Clarence A. O'Brien
Attorney

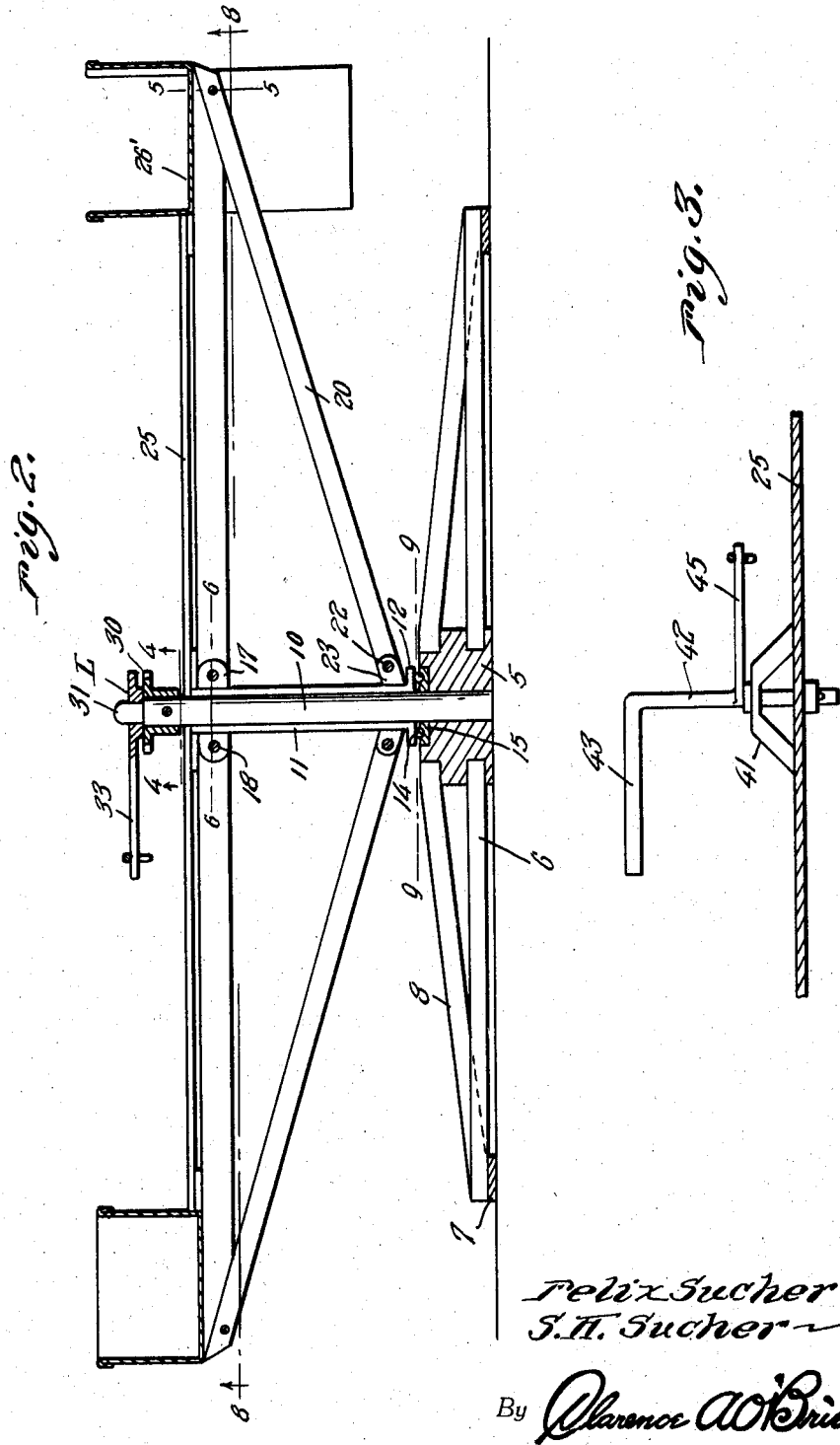

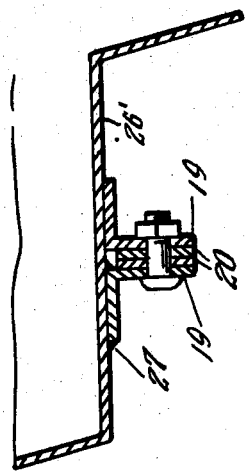
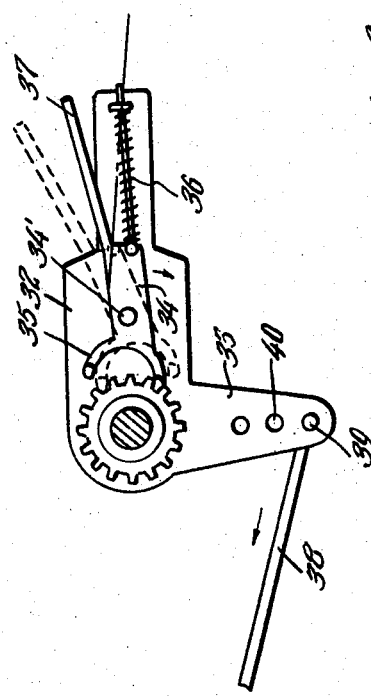
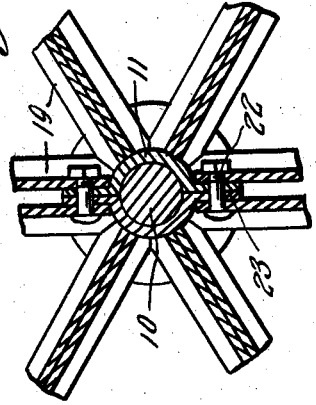

July 7, 1931. F. SUCHER ET AL 1,813,210
MERRY-GO-ROUND
Filed May 19, 1930 4 Sheets-Sheet 4
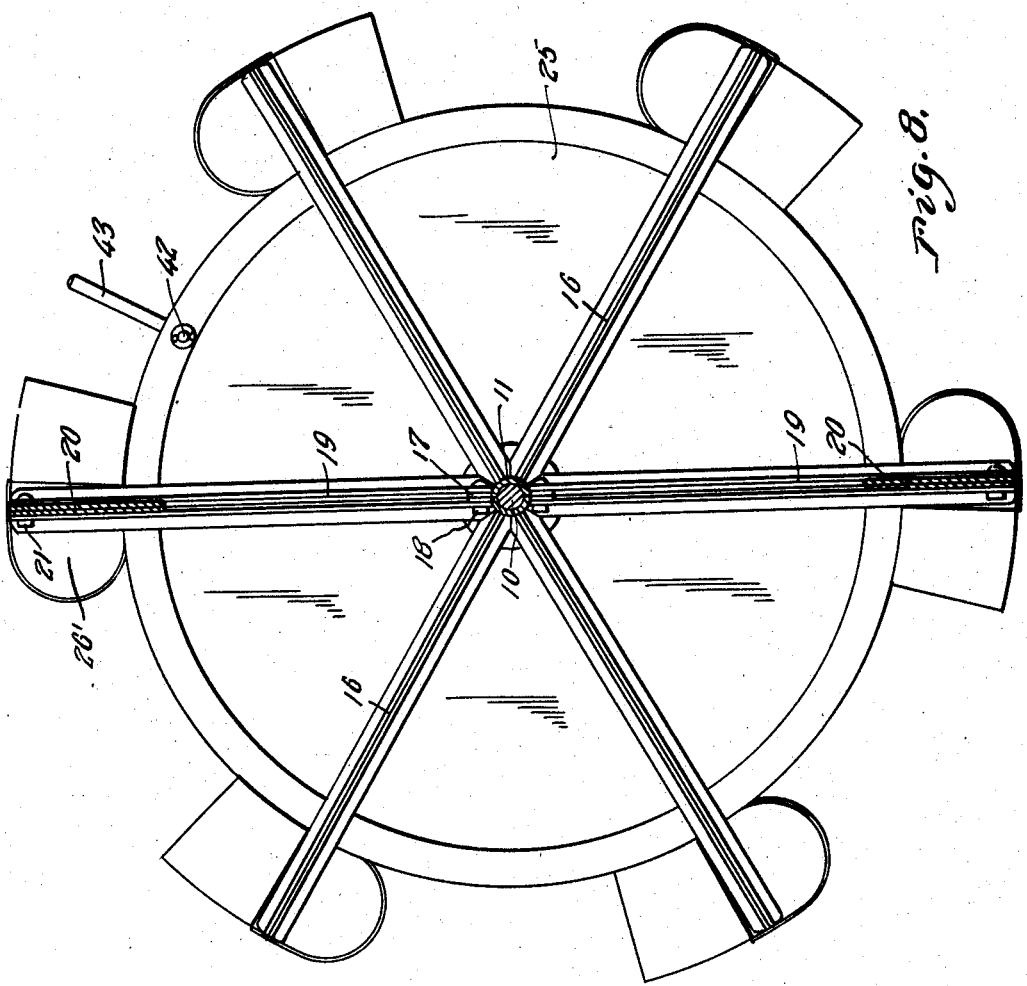
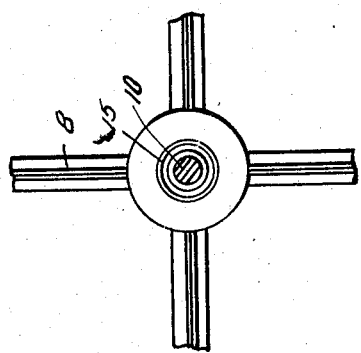
Inventors
Felix Sucher
S. H. Sucher
By Clarence A. O'Brien
Attorney Patented July 7, 1931

1,813,210

UNITED STATES PATENT OFFICE

FELIX SUCHER AND SOPHIA H. SUCHER, OF ST. LOUIS, MISSOURI

MERRY-GO-ROUND

Application filed May 19, 1930. Serial No. 453,687.

The present invention relates to a merry-go-round and has for its prime object to provide an apparatus of this nature which comprises two main sections which may be easily and quickly attached together or taken apart.

Another very important object of the invention resides in the provision of novel means for operating the merry-go-rounds by one of its occupants in a comparatively easy and expeditious manner.

A still further very important object of the invention resides in the provision of an apparatus of this nature which is exceedingly simple in its construction, inexpensive to manufacture, strong and durable, compact and convenient in its arrangement of parts, thoroughly efficient and reliable in use and operation, and in the combination and arrangement of parts as will be hereinafter more fully described and claimed.

In the drawings:

Figure 1 is a top plan view of the apparatus embodying the features of our invention, Figure 2 is a vertical section therethrough taken substantially on the line 2—2 of Figure 1, Figure 3 is a detail sectional view through the top plate showing the actuator, Figure 4 is a detail section taken substantially on the line 4—4 of Figure 2, Figure 5 is a detail section taken substantially on the line 5—5 of Figure 2, Figure 6 is a detail section taken substantially on the line 6—6 of Figure 2, Figure 7 is a detail elevation of the bell crank lever with its pawl and ratchet mechanism, Figure 8 is a horizontal section taken substantially on the line 8—8 of Figure 2, and Figure 9 is a horizontal section taken substantially on the line 9—9 of Figure 2.

Referring to the drawings in detail it will be seen that the numeral 5 denotes a base block with a plurality of arms 6 radiating outwardly therefrom and having their outer ends resting on a base ring 7. Braces 8 extend from the ring 7 and incline upwardly and rearwardly to the upper portion of the block 5. A stationary standard rises from the block 5. A sleeve 11 split into two sections is disposed about the standard 10 and is formed with an outwardly directed flange 12 at its bottom end resting on ball bearings 14 in a race 15 mounted on top of the block 15 circumjacent the standard 10.

A plurality of arms 16 radiate outwardly and horizontally from the upper portion of the sleeve 11, a pair to each section thereof. Each arm 16 comprises a pair of angle irons secured together by welding or the like and the inner ends of these arms are fixed to the sleeve by welding or the like. A pair of apertured ears 17 extend from the upper portions of each section of the sleeve and bolts 18 are disposed therethrough and also through angle irons 19 which extend out horizontally to form additional arms similar to arms 16.

These angle irons have suitable spacers 20 between their outer ends which are assembled together by bolts 21. These spacers 20 are in the form of braces and incline downwardly and inwardly and are bolted as at 22 to ears 23 at the lower end of the sections of the split sleeve 11.

Other braces may be provided for the arm 16. Semi-circular plates 25 are suitably mounted on the arms 16 and the angle irons 19. Seats 26 are mounted on the outer ends of the arms 16 and the angle irons 19. As is indicated in Figure 5, the seats on the outer ends of the angle irons will be welded as at 27 or otherwise permanently secured to one of each pair of the angle irons. In this way it will be seen that the apparatus is in two main sections. This is important in storing and shipping the apparatus.

On the upper end of the standard 10 and above the plate 25 there is fixed the toothed wheel 30. The reduced extension 31 rises from the standard 10 and has rockable thereon a bell crank lever L comprising arms 32 and 33. A dog 34 is pivotally mounted as at 34' on the arm 31 and has bifurcated end, the furcations 35 of which are engageable with toothed wheel 30. A spring arrangement 36 tends to hold one or the other of the furcations in engagement with the toothed wheel as desired. An extension 37 is provided on the dog so that it may be pushed to the full line position shown in Figure 4 or the dotted line position shown in Figure 4 depending upon the direction of rotation of the apparatus desired.

The connecting rod 38 has an end 39 receivable in one of a plurality of openings 40 in the arm 33. On one of the plates 25 there is a bracket 41 in which is journalled an actuator shaft 42 also journalled through the plate. An actuating crank 43 is provided at the upper end of the shaft 42. Another crank 43 is formed on the shaft 42 at right angles to the arm 43 and the connecting rod is engaged with the end thereof.

Therefore, a person sitting in the seat immediately adjacent the actuator may oscillate the shaft 42 by swinging the crank 43 back and forth thereby bringing about the rotation of the apparatus in either direction desired depending upon which direction the dog 34 has been set.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

In an apparatus of the class described, a vertical standard, means for supporting the standard, a sleeve rotatable about the standard, arms radiating outwardly from the standard, seats on the ends of the arms, and means for causing the rotation of the sleeve about the standard, said means for rotating the sleeve comprising a toothed wheel fixed to the standard, a bell crank lever rockable on the standard, a pawl on the lever engageable with the toothed wheel and means for oscillating the lever, said pawl having a bifurcated engaging end, and spring means holding one or the other of the furcations in engagement with the toothed wheel as desired.

In testimony whereof we affix our signatures.

FELIX SUCHER.
SOPHIA H. SUCHER.